United States Patent
Tanaka (10) Patent No.: US 7,634,850 B2
(45) Date of Patent: Dec. 22, 2009

(54) METHOD OF MANUFACTURING MAGNETIC HEAD SLIDER

(75) Inventor: Koji Tanaka, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/880,190

(22) Filed: Jul. 20, 2007

(65) Prior Publication Data

US 2008/0022510 A1   Jan. 31, 2008

(30) Foreign Application Priority Data

Jul. 21, 2006   (JP)   ............... 2006-199134

(51) Int. Cl.
*G11B 5/127* (2006.01)
*H04R 31/00* (2006.01)

(52) U.S. Cl. .............. 29/603.12; 29/603.07; 29/603.13; 29/603.14; 29/603.16; 29/603.18; 451/5; 451/8; 451/10; 451/36; 451/41

(58) Field of Classification Search . 29/603.09–603.12, 29/603.15, 603.16, 603.18, 603.23, 737; 451/5, 8, 10, 36, 37, 41
See application file for complete search history.

(56) References Cited

U.S. PATENT DOCUMENTS

| | | | |
|---|---|---|---|
| 6,193,584 B1 * | 2/2001 | Rudy et al. | ..................... 451/5 |
| 6,884,148 B1 | 4/2005 | Dovek et al. | |
| 6,905,394 B2 * | 6/2005 | Sudo et al. | ..................... 451/24 |
| 7,137,190 B2 * | 11/2006 | Hsiao et al. | .............. 29/603.08 |
| 2006/0028770 A1 * | 2/2006 | Etoh et al. | .................. 360/313 |
| 2007/0070543 A1 | 3/2007 | Gunder et al. | |

FOREIGN PATENT DOCUMENTS

| | | |
|---|---|---|
| JP | 2005-339781 | 12/2005 |
| JP | 2006-048806 | 2/2006 |

* cited by examiner

*Primary Examiner*—Paul D Kim
(74) *Attorney, Agent, or Firm*—Townsend and Townsend and Crew LLP; Rambod Nader (57) ABSTRACT

Embodiments of the present invention allow control over the element height of read and write heads without damage to a lapping surface table when an air-bearing surface is lapped with a row bar or magnetic head slider tilted. According to one embodiment, the air-bearing surface is lapped with the row bar tilted in the longitudinal direction of a slider to compensate element height-wise positional deviations of the read head and the write head. The lapping is performed while changing an inclination angle stepwise and swinging the row bar in the longitudinal direction of the slider centering around an inclination angle at each step. Thus, the element heights of the magnetic pole piece and the read element can be controlled without damage to a lapping surface table.

15 Claims, 8 Drawing Sheets

METHOD OF MANUFACTURING MAGNETIC HEAD SLIDER

CROSS-REFERENCE TO RELATED APPLICATION

The instant nonprovisional patent application claims priority to Japanese Patent Application No. 2006-199134 filed Jul. 21, 2006 and incorporated by reference in its entirety herein for all purposes.

BACKGROUND OF THE INVENTION

Magnetic disk drives used as external recording apparatuses for information-processing equipment such as computers, have been requested to increase recording capacity. To meet this request, increases in recording density have been contemplated. If the conventional longitudinal magnetic recording system is used to promote increased density, a demagnetizing field in the magnetic transition region on a medium is large. Therefore, it is necessary to reduce the thickness of a recording layer, which consequently produces a problem in that recorded data is lost due to thermal fluctuation. On the other hand, a perpendicular magnetic recording system in which a recording-magnetizing direction is a medium's thickness direction makes it easy to achieve high-recording density. This is because since a demagnetizing field in the magnetic transition region is small, a necessity to reduce the thickness of a medium is relatively small.

When a perpendicular recording magnetic head is used to record a signal in a perpendicular recording medium, the electric signal is converted into a magnetic signal by a coil to excite a magnetic flux at main and auxiliary magnetic pole pieces. Part of the magnetic flux flows from the auxiliary magnetic pole piece to the main magnetic pole piece, passing through a perpendicular recording layer of the recording medium. The part of the magnetic flux passes through a soft magnetic underlayer below the perpendicular recording layer and returns to the auxiliary magnetic pole piece, thus providing a closed loop. In this case, the auxiliary magnetic pole piece is used to magnetically-efficiently return the magnetic flux generated, from the main magnetic pole piece, in the perpendicular recording layer and soft magnetic underlayer of the recording medium, to the main magnetic pole piece again. Such flow of the magnetic flux records a signal as magnetization on the perpendicular recording medium.

To increase the recording density in the perpendicular recording system, it is necessary to process a write head as well as a read head to provide its element height with a high degree of precision. Japanese Patent Publication No. 2006-48806 ("Patent document 1") describes the following: A read head-specific detection pattern for air-bearing surface processing and a write head-specific detection pattern for air-bearing surface processing are provided at a portion to become a slider. The detection pattern for air-bearing surface processing on the write head side is used to lap the air-bearing surface while monitoring the element height (throat height) of the write head. In this case, both the element height (throat height) of the write head and the element height (sensor height) of the read head can be controlled by monitoring the read head-specific detection pattern for air-bearing surface processing. In addition, the resistances of processing detection patterns for the write and read heads are detected during the lapping of the air-bearing surface of the heads. If it is found that the throat height of the write head is larger than the sensor height of the read head, the write head is lapped to reduce the throat height with the lapping surface tilted.

Japanese Patent Publication No. 2005-339781 ("Patent document 2") describes the following: A first electric lapping guide (ELG) is located near the sensor of a read head and a second ELG and a first optical lapping guide (OLG) are provided near the main magnetic pole piece of a write head. The resistance value of the first ELG is correlated with the resistance value of the second ELG and the width of the first OLG. On the basis of the correlation, the throat height of the write head is controlled independently while controlling the sensor height of the read head. In addition, a lapping surface is tilted to compensate for an element height-wise positional deviation occurring when a main pole region is formed above the sensor.

In the conventional technologies described above, the lapping surface of a row bar or slider is tilted and pressed against a lapping surface table for lapping in order to control the element heights of the read head and write head. In this case, a corner of the row bar or slider is likely to come into contact with and damage the lapping surface table at certain inclination angles. When the row bar or slider is tilted to the leading end side for lapping, since the ELG formed on the trailing end side is not lapped, the resistance value of the ELG remains unchanged. Thus, while the leading end side is lapped, the ELG signal is not obtained. Therefore, the control of the element height will be unstable.

BRIEF SUMMARY OF THE INVENTION

Embodiments of the present invention allow element height of read and write heads to be controlled without damage to a lapping surface table when an air-bearing surface is lapped with a row bar or magnetic head slider tilted. According to one embodiment, when a row bar is tilted in the longitudinal direction of a slider to lap its air-bearing surface according to the positional deviations of a read element and a main magnetic pole piece, an inclination angle $\theta c$ is changed stepwise in order of $\theta c$, $\theta x$ and $\theta t$, with respect to a target inclination angle $\theta t$ and the row bar is lapped while being swung by $\alpha$ in the longitudinal direction of the slider around an inclination angle at each step. A swing width $\alpha$ is controlled to gradually attenuate. Thus, the element heights of the magnetic pole piece and the read element can be controlled without damage to a lapping surface table.

DETAILED DESCRIPTION OF THE INVENTION

Embodiments in accordance with the present invention relate to a method of manufacturing a magnetic head slider.

An object of embodiments according to the present invention is to enable the element height control of read and write heads without damage to a lapping surface table when an air-bearing surface is lapped with a row bar or magnetic head slider tilted.

To achieve the above object, a method of manufacturing a magnetic head slider according to an embodiment of the present invention includes: the step of forming a head element on a wafer; the step of cutting the wafer into row bars; and the subsequent step of lapping an air-bearing surface, in which if an air-bearing surface is lapped with the row bar tilted in the longitudinal direction of a slider to compensate element height-wise positional deviations of a read element and a main magnetic pole piece, the lapping is performed while changing an inclination angle of the row bar stepwise with respect to the target inclination angle and swinging the row bar in the longitudinal direction of the slider centering around an inclination angle at each step. The manufacturing method can control the element heights of the main magnetic pole piece and the read element without damage to a lapping surface table.

The lapping of the air-bearing surface described above can be performed on separate individual magnetic head sliders which are obtained by cutting a row bar thereinto.

According to embodiments of the present invention, when an air-bearing surface is lapped with a row bar or a magnetic head slider tilted, element heights of a read head and a write head can be controlled without damage to a lapping surface table.

Figure 11:
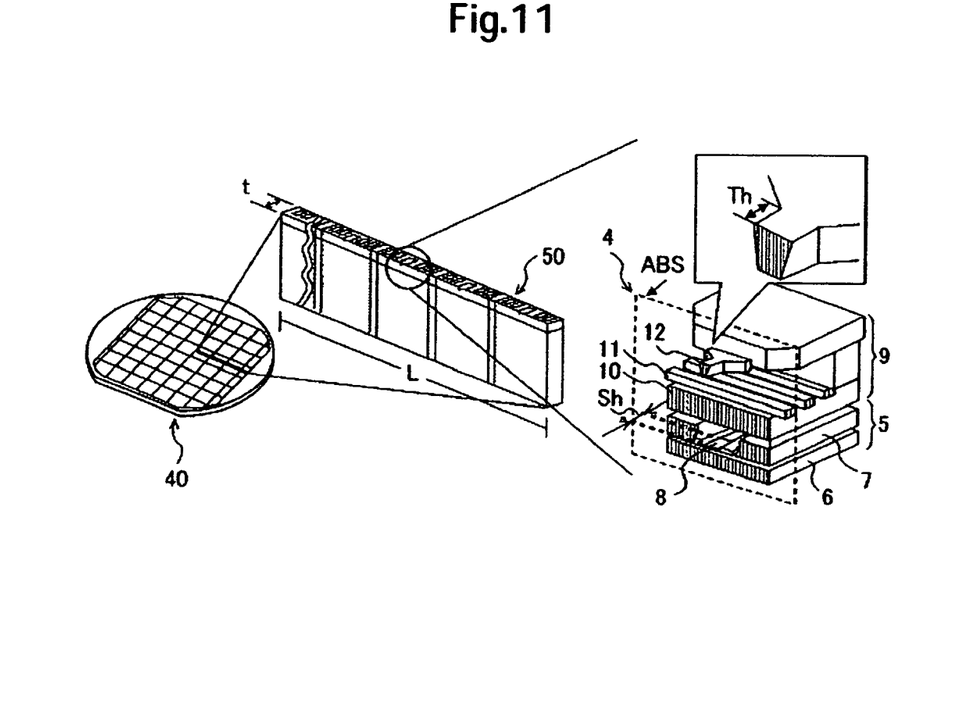
FIG. 11 illustrates the schematic configuration of a wafer, a row bar cut out from the wafer and a perpendicular recording magnetic head on the row bar.
Figure 12:
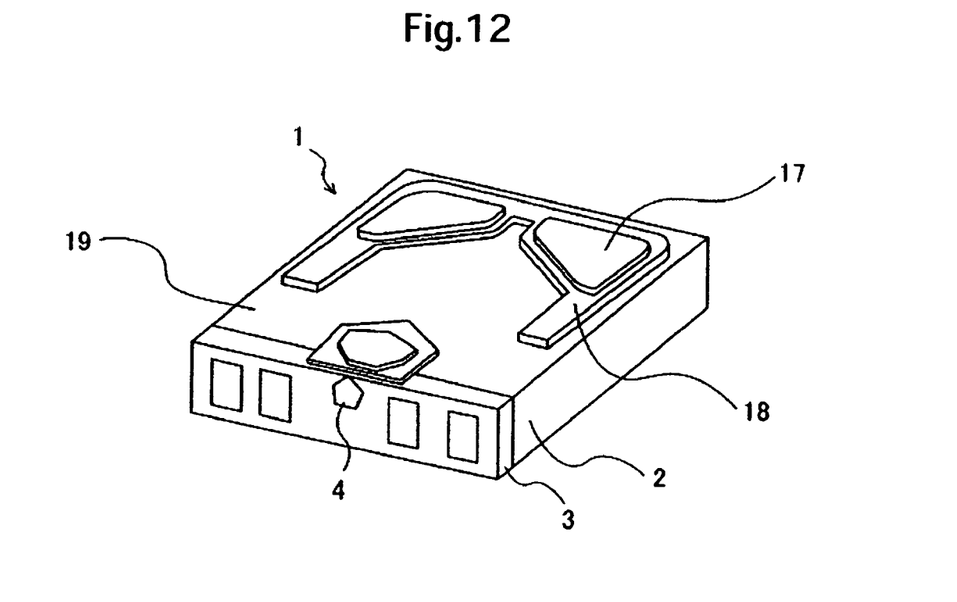
FIG. 12 is a perspective view illustrating the configuration of a magnetic head slider by way of example.

A description will first be made of configurations of a perpendicular recording magnetic head and a magnetic head slider embodying the present invention with reference to FIGS. 11 and 12. FIG. 11 is an illustration of schematic configurations of a wafer 40, a row bar 50 cut out from the wafer and a perpendicular recording magnetic head 4 on the row bar. FIG. 12 is an illustration of configurations of a magnetic head slider 1 obtained by cutting the row bar 50. Referring to FIG. 11, the perpendicular recording magnetic head 4 is composed of a write head 9 and a read head 5. The write head 9 is a head which generates a magnetic field used to record data in a recording layer of a magnetic disk not shown. In addition, the write head 9 is a single magnetic pole head which includes a main magnetic pole piece 12, an auxiliary magnetic pole piece 10 and a thin film coil 11 which is interlinked with a magnetic circuit formed by the main magnetic pole piece and the auxiliary magnetic pole piece. The read head 5 is a head adapted to read data written in the recording layer of the magnetic disk. In addition, the read head 5 includes a read element 8 such as a GMR element, a TMR element, or the like put between a pair of upper and lower magnetic shields 6, 7. At the time of recording, a magnetic flux from the main magnetic pole piece 12 of the write head 9 passes through a recording layer and a soft magnetic underlayer of the magnetic disk and returns to the auxiliary magnetic pole piece 10, thus forming a magnetic flux path, and records a magnetizing pattern in the recording layer. To realize satisfactory reading and writing, it is necessary to process the write head 9 and read head 8 to provide an element height (throat height) Th and an element height (sensor height) Sh, respectively, both having a high degree of precision. The throat height is a height from the air-bearing surface (ABS) to a flare point of the main magnetic pole piece 12 included in the write head 9. The sensor height is a height from the ABS of the read element 8 included in the read head 5.

Referring to FIG. 12, the magnetic head slider 1 includes a slider 2 and a head element section 3 which is provided with the above-mentioned perpendicular recording magnetic head 4. Air-bearing surface rails 17, lower rails 18 and a lower surface 19 are formed on the air bearing surface confronting the magnetic disk of the magnetic head slider 1.

Figure 10:
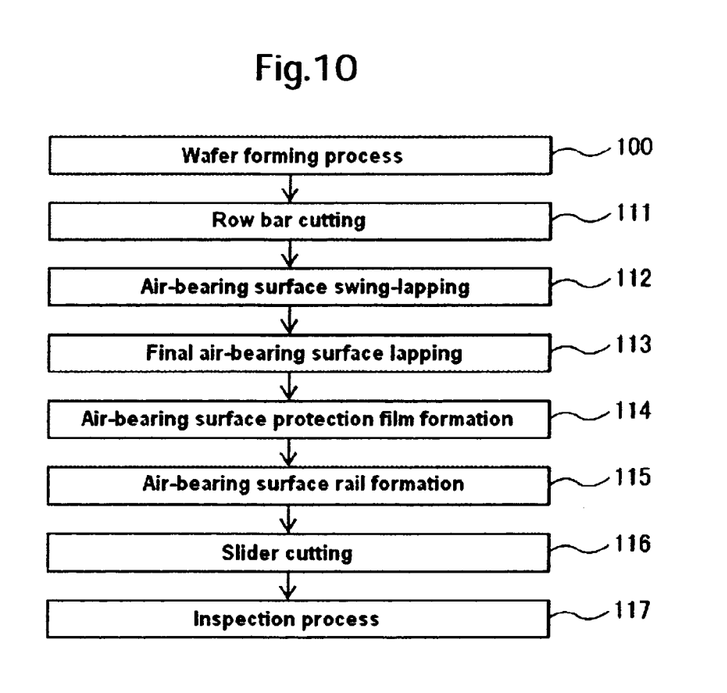
FIG. 10 is a process chart of a method of manufacturing of a magnetic head slider according to an embodiment of the present invention.

With reference to FIG. 10, a description is next made of a method of manufacturing the magnetic head slider, including an air-bearing surface swing-lapping process for controlling the throat height Th and the sensor height Sh with a high degree of precision according to embodiments of the present invention. FIGS. 11-12 are referenced as well.

Step 100: In a wafer formation process, the read head 5 and the write head 9 are formed on the wafer 40 by thin film processes such as sputtering, ion milling, photolithography, etc. As described later and shown in FIGS. 5 and 6, process detection patterns (ELG) 20-24 for reading are formed when the read element 8 is formed and process detection patterns (ELG) 30-33 for writing are formed when the main magnetic pole piece 12 is formed.

Step 111: In a row bar cutting process, the wafer 40 is cut into row bars 50 by slicing using a diamond cutting whetstone as a tool. The row bar 50 is composed of about fifty head elements joined together and has a length L of about 50 mm and a thickness t of about 0.3 mm.

Step 112: An air-bearing surface swing-lapping process is a process for controlling the throat height Th and the sensor height Sh. In this process, the lapping surface (the air-bearing surface) of the row bar 50 is pressed against and lapped by the rotating lapping surface table while being tilted and swung in the longitudinal direction of the slider. In addition, to measure element heights during the lapping process, the resistance values of the ELGs 20-24 and ELGs 30-33 are measured. Incidentally, the air-bearing surface swing-lapping is detailed later.

Step 113: In a final air-bearing surface lapping process, the air-bearing surface is lapped to improve the surface roughness of the air-bearing surface and reduce differences in step in the process.

Step 114: In an air-bearing surface protection film forming process, a protection film having a thickness of 3 to 6 nm is formed to protect the read head 5 and write head 9 both exposed to the air-bearing surface. The protection film is formed with a Si film as a contact layer and with a diamond-like carbon thereon.

Step 115: In an air-bearing surface rail forming process, the air-bearing surface rails 17, lower rails 18 and lower surface 19 are formed on the air-bearing surface by dry processing such as ion milling, RIE or the like. Specifically, the row bar 50 is fixed to a rail formation jig using a thermoplastic adhesion tape. Resist is applied to the front face of the air-bearing surface. After exposure and development, portions other than the rails are removed by the dry processing mentioned above. Thereafter, the resist left on the air-bearing surface is peeled off. The process from the resist application to resist peeling is repeated two times to thereby form the two-stepped-shaped air-bearing surface having the air-bearing surface rails 17, lower rails 18 and lower surface 19 as shown in FIG. 12.

Step 116: In a slider cutting process, the row bar 50 is cut into individual separate magnetic head sliders 1 by slicing using the diamond cutting whetstone as a tool.

Step 117: In an inspection process, after the separated magnetic head sliders 1 are obtained, the write heads 9 and read heads 5 are subjected to property measurement and to an external appearance check and non-defective products are selected.

Figure 7:
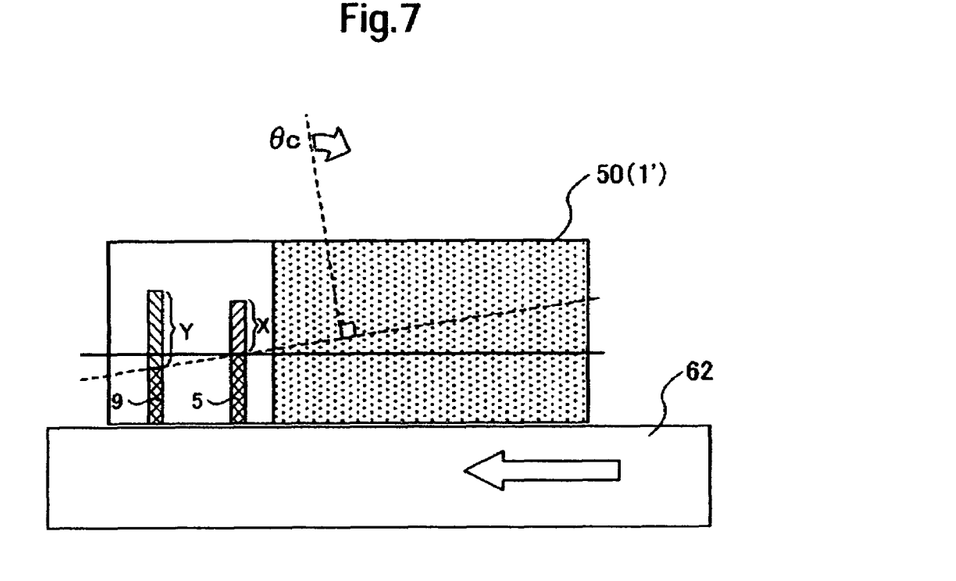
FIG. 7 is a cross-sectional view of a magnetic head slider portion on a row bar before air-bearing surface lapping.

Air-bearing surface parallel-lapping and air-bearing surface inclination-lapping are next described before the detailed description of the air-bearing surface swing-lapping process 112 mentioned above. FIG. 7 is a cross-sectional view of the row bar 50 (a magnetic head slider portion 1') before air-bearing surface lapping. As shown in FIG. 7, in the case where the matching deviation between the write head 9 and the read head 5 occurs in the wafer forming process, the air-bearing surface of the row bar 50 (the magnetic head slider portion 1') may be lapped parallel to the air-bearing surface as indicated with a solid line. In this lapping, when the sensor height Sh of the read head 5 reaches a designed dimension X, the throat height Th of the write head 9 is shorter than the designed dimension Y. If the row bar 50 is tilted so that the position of a dotted line is parallel to the lapping surface table 62, the element heights of the read head 5 and the write head 9 can be controlled according to the designed dimensions. However, if the angular correction of the row bar 50 is performed at one time, then the leading edge side corner of the row bar 50 comes into contact with the lapping surface table 62, which is likely to damage the front face of the lapping surface table 62. Since the lapping surface table 62 is usually made of soft metal such as tin, it is highly likely to be damaged when the corner comes into contact therewith. If the surface of the lapping surface table 62 is damaged, it is necessary to interrupt the lapping and repair or replace it, which leads to deterioration in production efficiency and to a rise in manufacturing cost.

Figure 9:
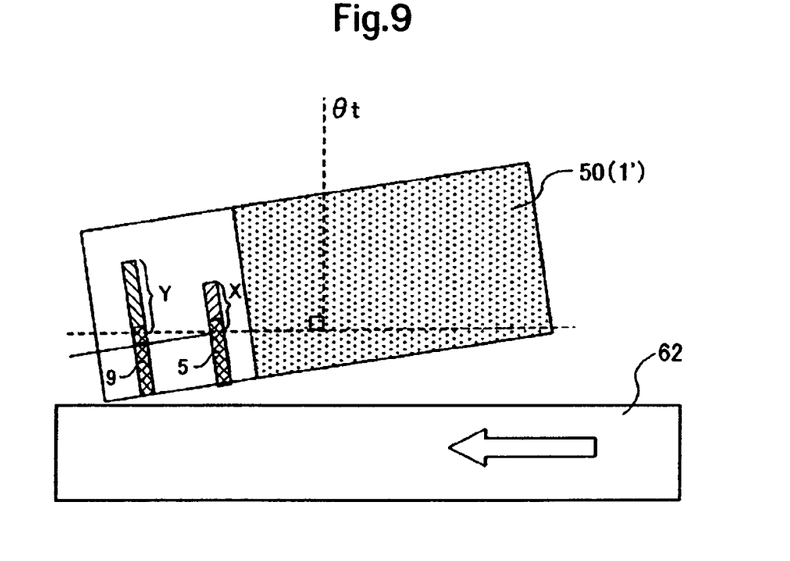
FIG. 9 is a cross-sectional view of the magnetic head slider portion with the head element forming portion side of the row bar tilted.

Incidentally, the positional deviation between the write head 9 and the read head 5 may sometimes occur in a direction reverse to the direction as described with FIG. 7. In this case, as shown in FIG. 9, the row bar 50 is tilted so that the head element forming portion side comes close to the lapping surface table 62, which poses the same problem as described above.

Figure 8:
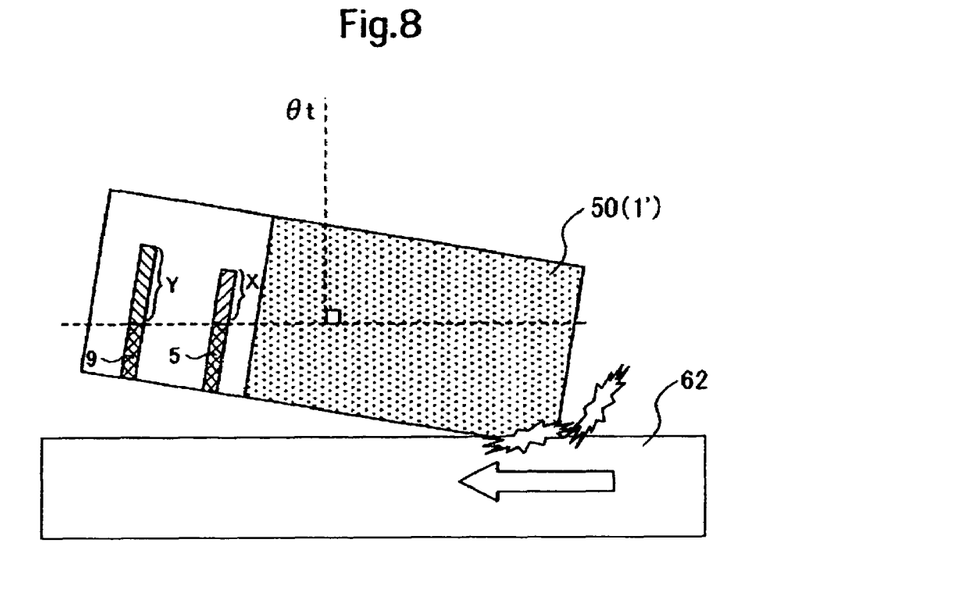
FIG. 8 is a cross-sectional view of the magnetic head slider portion with the leading end side of the row bar tilted.

As shown in FIG. 8, when the row bar 50 is tilted so that the leading edge side opposite to the head element forming portion comes close to the lapping surface table 62, the head element is not lapped in some cases. In this case, since the ELG signal remains unchanged, there arises a problem in that control of the element heights becomes unstable.

Figure 1:
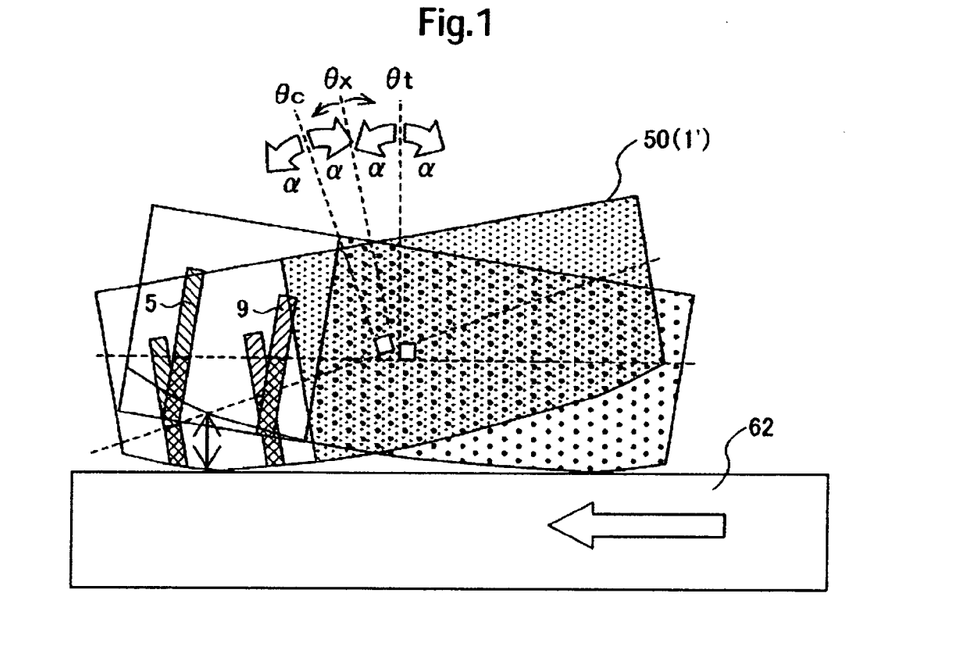
FIG. 1 illustrates the inclination and swing of a row bar at the time of air-bearing surface lapping according to an embodiment of the present invention.
Figure 2:
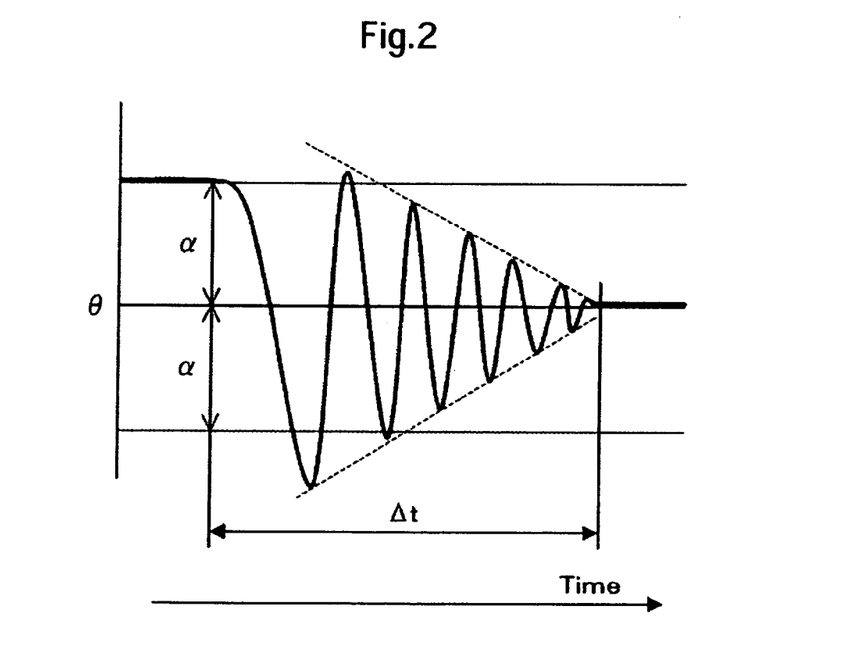
FIG. 2 illustrates control of swing of the row bar.

To solve the problem, according to embodiments of the present invention stepwise changes the inclination angle of the row bar 50 with respect to the target inclination angle in the air-bearing surface swing-lapping process 112 described above and performs the lapping while swinging the row bar 50 in the longitudinal direction of the slider at each step. The inclination- and swing-lapping of the row bar 50 is described in detail with reference to FIGS. 1 and 2. FIG. 1 illustrates movement of the row bar 50 (the magnetic head slider portion 1') during the lapping. FIG. 2 illustrates the concept of the swing control for the row bar 50. The inclination angle is changed from an angle θc (θcurrent) at the time of starting lapping shown in FIG. 7 to a target inclination angle θt (θtarget) shown in FIG. 8. In this case, the inclination angle is changed stepwise from the angle θc to θx and θt as shown in FIG. 1. In addition, the row bar 50 (the magnetic head slider portion 1') is swung by a in the longitudinal direction of the slider at each step. A swing width α is gradually attenuated as shown in FIG. 2.

As described above, when the row bar 50 is tilted in the longitudinal direction of the slider to compensate the positional deviations of the read element 8 and the main magnetic pole piece 12, the inclination angle is changed stepwise and the row bar 50 is swung in the longitudinal direction of the slider around the inclination angle at each step. Thus, the element heights of the main magnetic pole piece 12 and the read element 8 can be controlled without damage to the lapping surface table.

Figure 3:
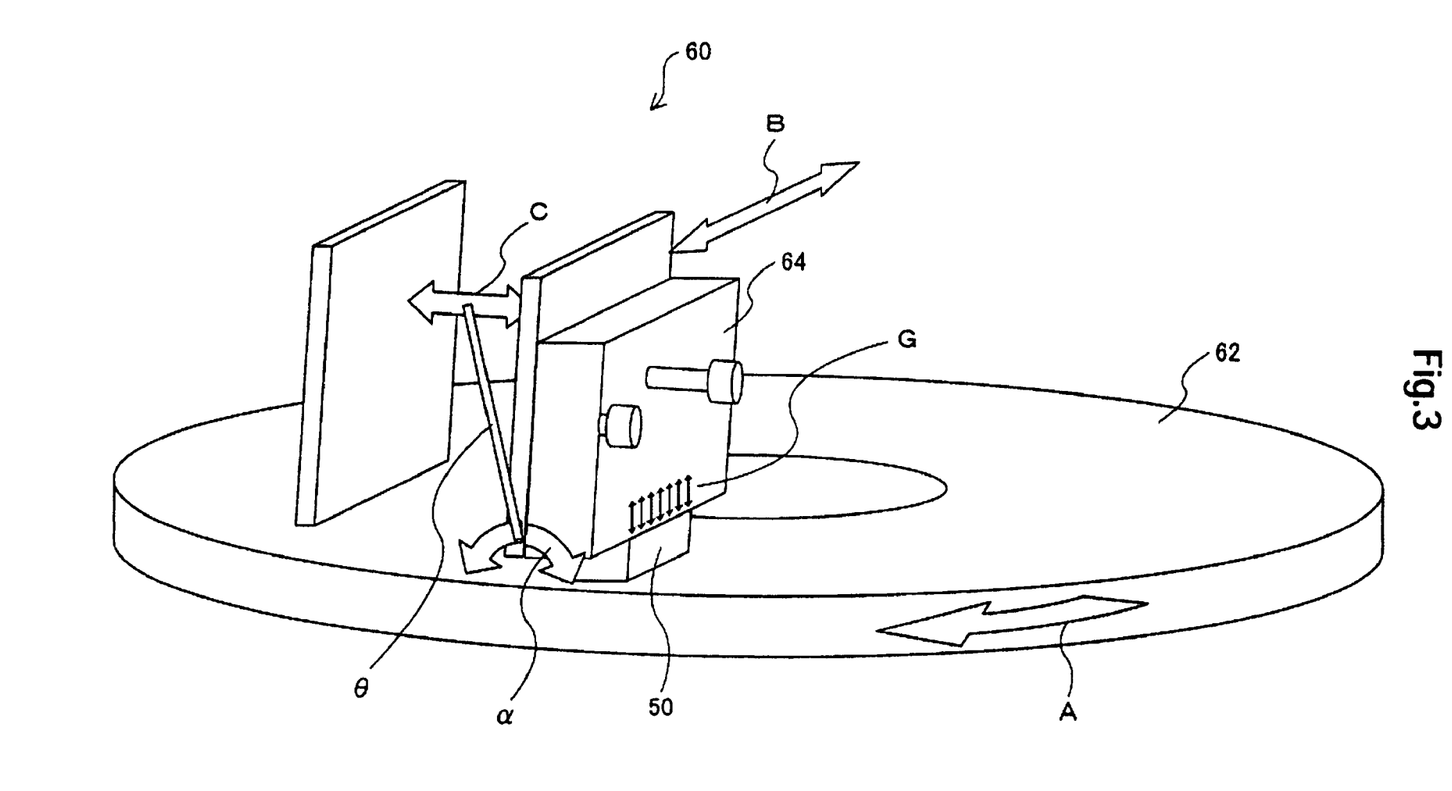
FIG. 3 is a schematic configuration diagram of a lapping device applied to an embodiment of the present invention.
Figure 4:
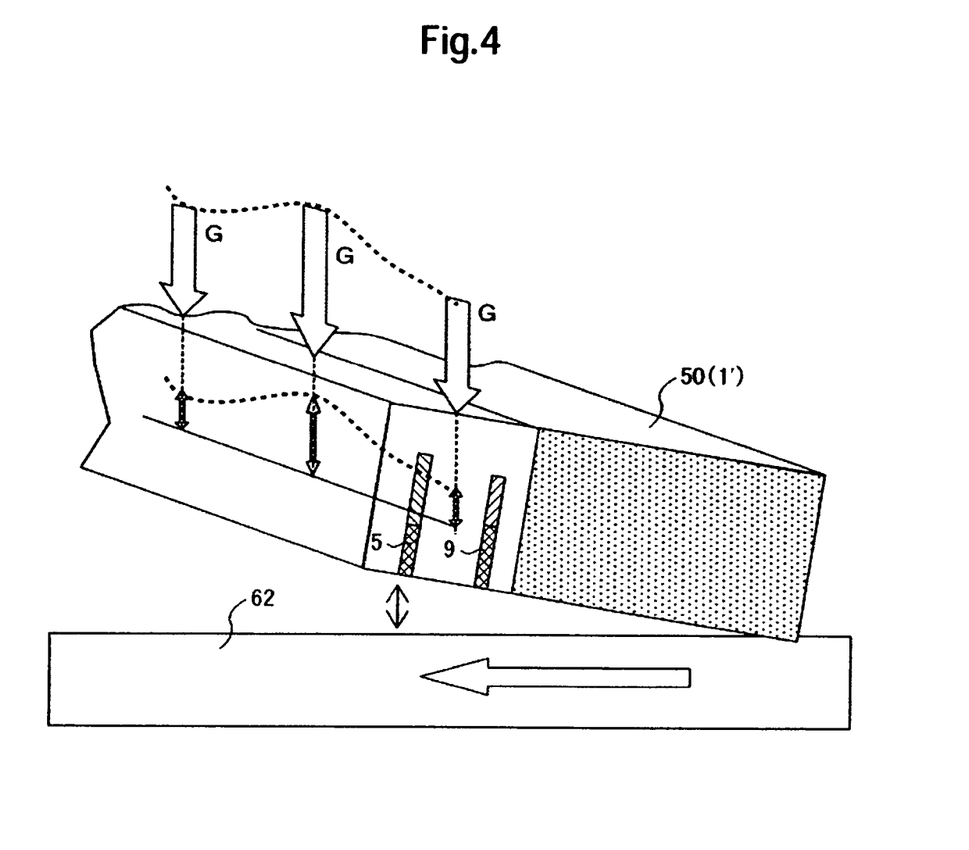
FIG. 4 is an illustration of offset loads applied to the row bar.

FIG. 3 illustrates the schematic configuration of an air-bearing surface lapping device. The lapping device 60 includes the soft metal surface table (lapping surface table) 62 comprising tin as a main ingredient, and a lapping jig 64 holding the row bar 50 (or the magnetic head slider) as a to-be-lapped body. The lapping surface table 62 is rotated in a direction of arrow A at a rotational speed of 10 to 70 r/min. The lapping jig 64 swings in the radial direction B of the lapping surface table 62 at a swing speed of 20 to 60 mm/sec. The lapping jig 64 adjusts the inclination angle θ of the row bar 50 by being tilted in the circumferential direction C of the lapping surface table 62. The lapping device 60 is equipped with a swing mechanism which swings the row bar 50 in the longitudinal direction of the slider at a swing width α. In addition, the lapping device 60 is equipped with a lapping load control mechanism including a voice coil, an air cylinder or the like. This control mechanism serves to apply offset loads G to the row bar 50 as shown in FIG. 4, create a process-amount distribution in the row bar 50 and control the process-amount distribution for controlling the element heights. In lapping, the row bar 50 is secured to the lapping jig 64 with wax or the like. Then, the lapping surface (the air-bearing surface) is pressed against the lapping surface table 62 for lapping. For the purpose of ensuring processing efficiency and of improving the surface roughness of the air-bearing surface, the lapping surface is lapped until just before the element heights of the write head 9 and the read head 5 reach a predetermined size by using an oily polishing solution containing diamond abrasive grains. Thereafter, the lapping surface is lapped while dropping an oily polishing solution containing no diamond until the element heights of the write head and the read head reach the predetermined size.

Figure 5:
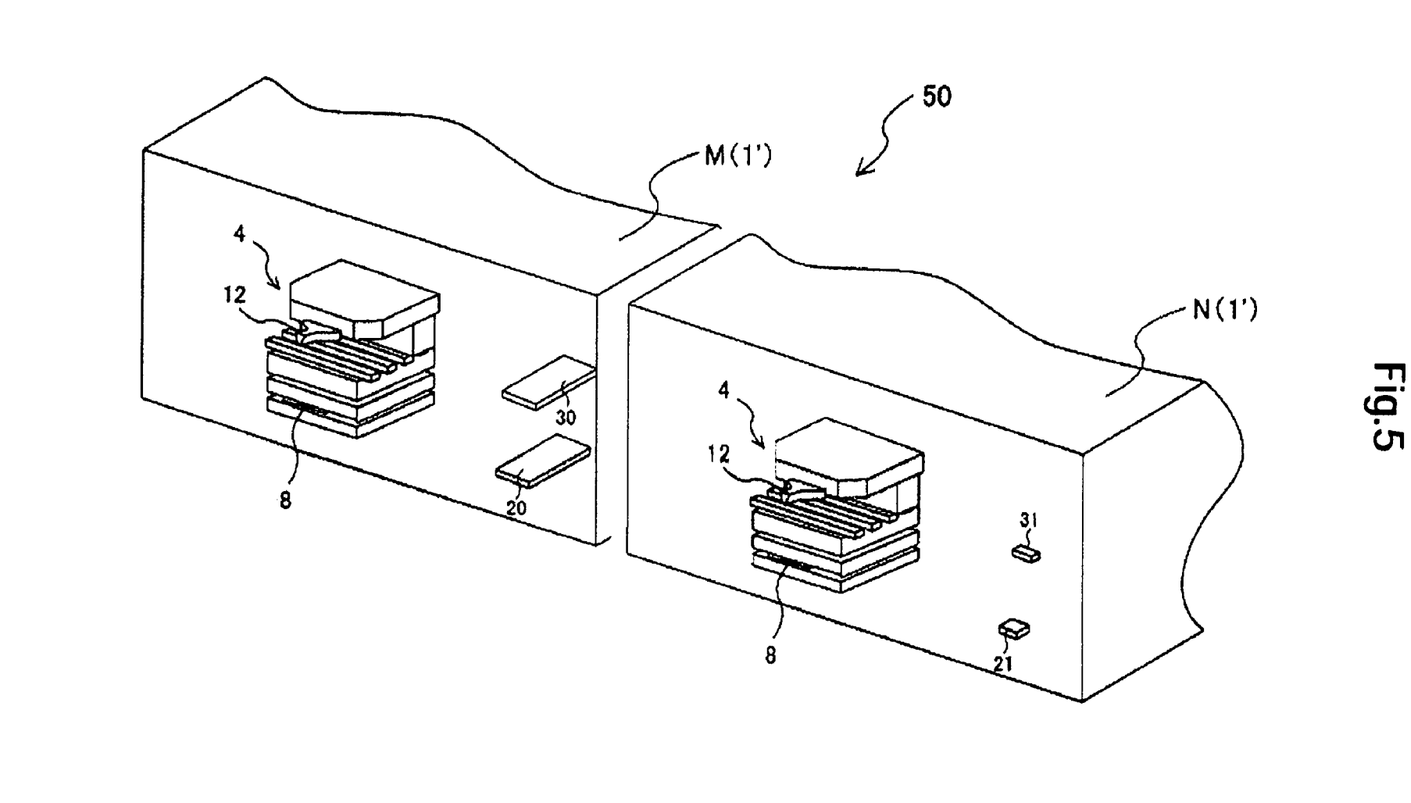
FIG. 5 is an illustration of arrangement of process detection patterns (ELGs) in an embodiment of the present invention by way of example.
Figure 6:
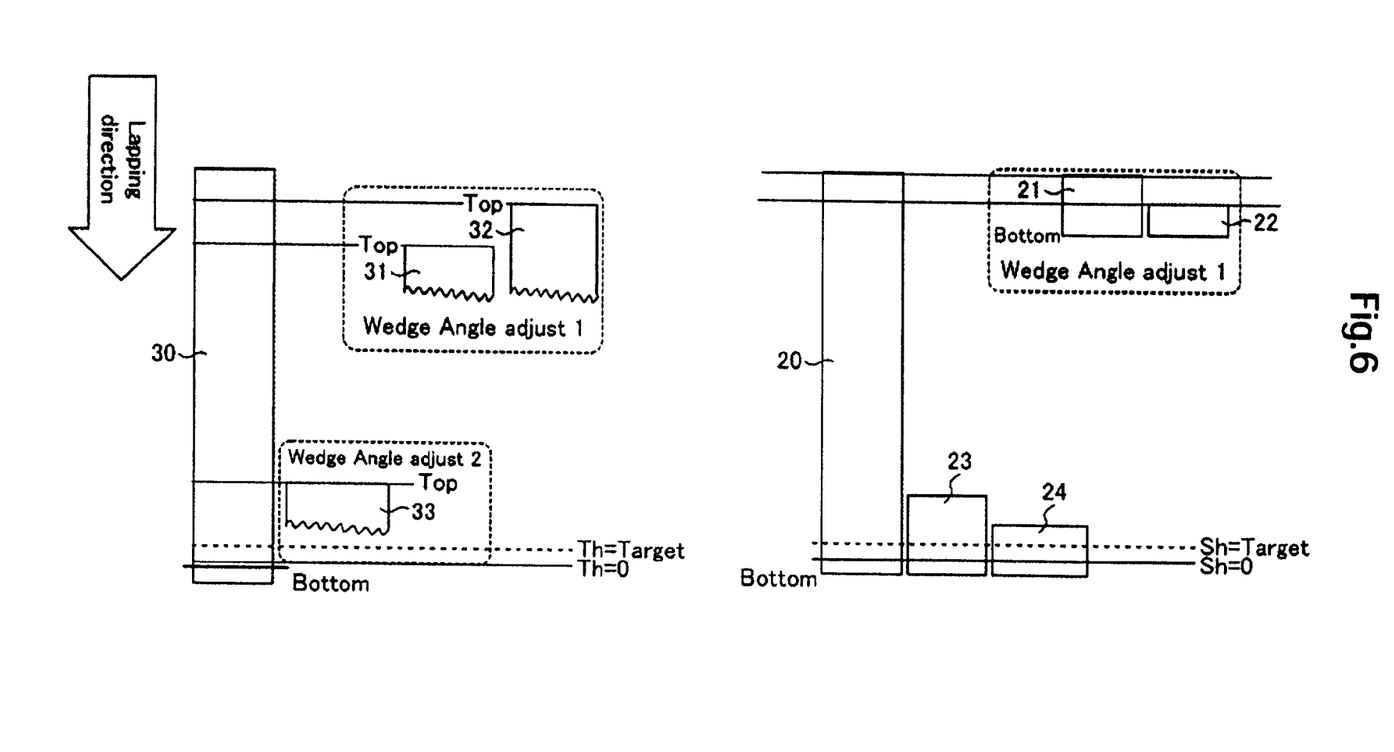
FIG. 6 is a schematic diagram of write ELGs and read ELGs arranged on a plane.

FIG. 5 illustrates exemplary arrangement of process detection patterns (ELG) used to control the throat height Th and sensor height Sh of the perpendicular recording magnetic head 4 when the air-bearing surface of the row bar 50 (magnetic head slider portion 1') is lapped. A write ELG 30 and a read ELG 20 are disposed at the same layer as the main magnetic pole piece 12 and at the same layer as the read element 8, respectively, of the magnetic head slider portion M(1') contained in the row bar 50. A write ELG 31 and a read ELG 21 are disposed at the same layer as the main magnetic pole piece 12 and at the same layer as the read element 8, respectively, of another magnetic head slider portion N(1') contained in the row bar 50. To facilitate understanding of arrangement configuration, FIG. 6 schematically illustrates write ELGs 30-33 and read ELGs 20-24 arranged on the same plane. Of the write ELGs 30-33, the ELG 30 is a detection pattern for monitoring the throat height Th of the main magnetic pole piece 12. The ELGs 31, 32, 33 are detection patterns for adjusting the inclination angle (Wedge Angle) of the row bar 50. The tip positions of the ELGs 31, 32, 33 have a correlation with the throat height Th. Of the read ELGs 20-24, the ELGs 20, 23, 24 are detection patterns for monitoring the sensor height Sh of the read element 8. The ELGs 21, 22 are detection patterns for adjusting the inclination angle (wedge angle) of the row bar 50. The rear end positions of the ELG 21, 22 have a correlation with the sensor height Sh. The write ELGs and read ELGs having such use applications are different from each other in type for each of the magnetic head sliders contained in the row bar 50. In addition, they are used as necessary when the air-bearing surfaces of the row bar 50 are lapped.

As described above, according to the method of manufacturing a magnetic head slider according to an embodiment of the present invention, when a row bar is lapped while being tilted in the longitudinal direction of a slider according to the positional deviations of a read element and a main magnetic pole piece, the inclination angle of the row bar is stepwise changed and the row bar is lapped while being swung in the longitudinal direction of the slider around the inclination angle at each step. Thus, the element heights of the main magnetic pole piece and the read element are controlled without damage to the lapping surface table.

Incidentally, in the embodiment described above, an air-bearing surface lapping is performed on the row bar cut out from a wafer. However, after the row bar is cut into individual magnetic head sliders, each of the magnetic head sliders may be lapped in the same way as described above. After the air-bearing surface lapping, final air-bearing surface lapping, air-bearing surface protection film forming, air-bearing surface rail forming, and inspection are carried out. Also this case can provide the same effect as that of the embodiments described above.

What is claimed is:

1. A method of manufacturing a magnetic head slider, comprising the steps of:
    forming, a read head and a process detection pattern for read, and a write head and a process detection pattern for write, on a wafer;
    cutting the wafer into row bars each including a plurality of head elements contiguous to each other;
    pressing the row bar against a rotating lapping surface table, swinging the row bar in a radial direction of the lapping surface table and lapping an air bearing surface while monitoring the process detection patterns for read and write, in which if the air-bearing surface is lapped with the row bar tilted in the longitudinal direction of a slider to compensate element height-wise positional deviations of the read head and the write head, the lapping is performed while changing an inclination angle stepwise and swinging the row bar in the longitudinal direction of the slider centering around an inclination angle at each step;
    forming a protection film on the air-bearing surface after lapping the row bar; and
    cutting the row bar into separated individual magnetic head sliders, wherein in the step of lapping the air-bearing surface of the row bar, when the row bar is lapped while being swung in the longitudinal direction of the slider, a head element forming portion side and a leading end side of the row bar are lapped alternately.

2. The method according to claim 1, wherein in the step of lapping the air-bearing surface of the row bar, a width of swinging the row bar in the longitudinal direction of the slider is gradually attenuated.

3. The method according to claim 1, wherein, if the element height-wise positional deviations of the read head and the write head are such that when an element height of the write head reaches a designed dimension through the lapping, an element height of the write head deviates in a shorter direction, the row bar is tilted so that a leading end side comes close to the lapping surface table.

4. The method according to claim 1, wherein element height-wise positional deviations of the read head and the write head are detected by monitoring the process detection patterns for read and write, and to compensate the positional deviations, an inclination angle of the row bar in the longitudinal direction of the slider is changed stepwise.

5. The method according to claim 1, wherein in the process of lapping the air-bearing surface of the row bar, offset loads are further applied to the rear surface of the row bar.

6. A method of manufacturing a magnetic head slider, comprising the steps of:
    forming, a read head and a process detection pattern for read, and a write head and a process detection pattern for write, on a wafer;
    cutting the wafer into row bars each including a plurality of head elements contiguous to each other;
    pressing the row bar against a rotating lapping surface table, swinging the row bar in a radial direction of the lapping surface table and lapping an air bearing surface while monitoring the process detection patterns for read and write, in which if the air-bearing surface is lapped with the row bar tilted in the longitudinal direction of a slider to compensate element height-wise positional deviations of the read head and the write head, the lapping is performed while changing an inclination angle stepwise and swinging the row bar in the longitudinal direction of the slider centering around an inclination angle at each step;
    forming a protection film on the air-bearing surface after lapping the row bar; and
    cutting the row bar into separated individual magnetic head sliders, wherein the process detection pattern for write is formed in the same layer as a main magnetic pole piece constituting the write head and includes a detection pattern used to monitor a throat height of the main magnetic pole piece and a detection pattern used to adjust the inclination angle of the row bar.

7. The method according to claim 6, wherein in the step of lapping the air-bearing surface of the row bar, a width of swinging the row bar in the longitudinal direction of the slider is gradually attenuated.

8. The method according to claim 6, wherein, if the element height-wise positional deviations of the read head and the write head are such that when an element height of the write head reaches a designed dimension through the lapping, an element height of the write head deviates in a shorter direction, the row bar is tilted so that a leading end side comes close to the lapping surface table.

9. The method according to claim 6, wherein element height-wise positional deviations of the read head and the write head are detected by monitoring the process detection patterns for read and write, and to compensate the positional deviations, an inclination angle of the row bar in the longitudinal direction of the slider is changed stepwise.

10. The method according to claim 6, wherein in the process of lapping the air-bearing surface of the row bar, offset loads are further applied to the rear surface of the row bar.

11. A method of manufacturing a magnetic head slider, comprising the steps of:
    forming, a read head and a process detection pattern for read, and a write head and a process detection pattern for write, on a wafer;
    cutting the wafer into row bars each including a plurality of head elements contiguous to each other;

pressing the row bar against a rotating lapping surface table, swinging the row bar in a radial direction of the lapping surface table and lapping an air bearing surface while monitoring the process detection patterns for read and write, in which if the air-bearing surface is lapped with the row bar tilted in the longitudinal direction of a slider to compensate element height-wise positional deviations of the read head and the write head, the lapping is performed while changing an inclination angle stepwise and swinging the row bar in the longitudinal direction of the slider centering around an inclination angle at each step;

forming a protection film on the air-bearing surface after lapping the row bar; and cutting the row bar into separated individual magnetic head sliders, wherein the process detection pattern for read is formed in the same layer as a read element of the read head and includes a detection pattern used to monitor a sensor height of the read element and a detection pattern used to adjust the inclination angle of the row bar.

12. The method according to claim 11, wherein in the step of lapping the air-bearing surface of the row bar, a width of swinging the row bar in the longitudinal direction of the slider is gradually attenuated.

13. The method according to claim 11, wherein, if the element height-wise positional deviations of the read head and the write head are such that when an element height of the write head reaches a designed dimension through the lapping, an element height of the write head deviates in a shorter direction, the row bar is tilted so that a leading end side comes close to the lapping surface table.

14. The method according to claim 11, wherein element height-wise positional deviations of the read head and the write head are detected by monitoring the process detection patterns for read and write, and to compensate the positional deviations, an inclination angle of the row bar in the longitudinal direction of the slider is changed stepwise.

15. The method according to claim 11, wherein in the process of lapping the air-bearing surface of the row bar, offset loads are further applied to the rear surface of the row bar.

* * * * *